United States Patent [19]

Huber

[11] Patent Number: 5,236,060
[45] Date of Patent: Aug. 17, 1993

[54] THREE-WHEEL VEHICLE AND CONVERSION KIT

[76] Inventor: William D. Huber, 10970 Burnett Rd., Charlevoix, Mich. 49720

[21] Appl. No.: 872,290

[22] Filed: Apr. 22, 1992

[51] Int. Cl.⁵ .............................. B62D 61/06
[52] U.S. Cl. .................. 180/210; 180/215; 280/269
[58] Field of Search ............ 180/210, 215, 209; 280/269

[56] References Cited

U.S. PATENT DOCUMENTS

| | | | |
|---|---|---|---|
| 1,370,374 | 3/1921 | Smith | 180/215 |
| 2,493,817 | 1/1950 | Hare | 180/210 |
| 3,447,623 | 6/1969 | Hott | 180/210 |
| 3,610,358 | 10/1971 | Korff | 180/25 R |
| 3,836,177 | 9/1974 | Hoidt | 280/269 |
| 4,020,914 | 5/1977 | Trautwein | 180/210 |
| 4,088,199 | 5/1978 | Trautwein | 280/269 X |
| 4,158,397 | 6/1979 | Reynolds | 180/25 A |
| 4,351,410 | 9/1982 | Townsend | 180/215 |
| 4,469,344 | 9/1984 | Coil | 280/269 |
| 4,506,753 | 3/1985 | Wood, Jr. | 180/210 |
| 4,662,468 | 5/1987 | Ethier | 180/215 |
| 4,697,663 | 10/1987 | Trautwein | 180/210 |
| 4,703,824 | 11/1987 | Irimajiri et al. | 180/210 |

FOREIGN PATENT DOCUMENTS 2667041  3/1992  France .................. 180/210

*Primary Examiner*—Joseph F. Peters, Jr.
*Assistant Examiner*—Christopher P. Ellis
*Attorney, Agent, or Firm*—Varnum, Riddering, Schmidt & Howlett

[57] ABSTRACT

The invention is a conversion kit for converting a two-wheeled motorcycle into a three-wheeled motorcycle providing for increasing both the lateral and longitudinal stability of a conventional motorcycle while maintaining the conventional positioning of the motorcycle rider. The invention replacing the front wheel with a pair of opposed wheels connected to the conventional front fork by an elongated kit frame. The kit frame is narrow and does not provide for enclosing the driver within the frame. The elongated frame provides for greater longitudinal stability and the opposed front wheels provide for greater lateral stability. The kit frame is directly mounted to the conventional motorcycle front fork, requiring limited modification to the conventional motorcycle and eliminating special connectors required by prior designs.

17 Claims, 6 Drawing Sheets

THREE-WHEEL VEHICLE AND CONVERSION KIT

BACKGROUND OF THE INVENTION

1. Field of the Invention

This invention relates to a three-wheeled motorcycle; more particularly, to a kit for converting a two-wheeled motorcycle into a three-wheeled motorcycle.

2. Description of the Related Art

Motorcycles provide a basic form of economical transportation and are an alternative to the automobile. However, it is widely recognized that many hazards are associated with the operation of a motorcycle. Specifically, two-wheeled motorcycles are laterally less stable than three or four-wheeled vehicles. To provide increased stability of two-wheeled motorcycles, several references disclose replacing either the front or rear wheel of a two-wheeled motorcycle with two wheels, creating a three-wheeled vehicle which provides greater lateral stability. Exemplary of such references are the Trautwein U.S. Pat. Nos. 4,088,199 and 4,020,914. Both Trautwein patents call for replacing the front fork and triple tree of a conventional motorcycle with a parallelogram coupling assembly which is pivotally connected to the front and rear of the conventional motorcycle frame, providing for corresponding leaning of the motorcycle and the spaced front wheels during turning. A special bracket is used to connect the parallelogram frame to the front of the conventional motorcycle frame. The parallelogram frame has opposed front wheels which are approximately in the same longitudinal position as the front wheel of the conventional motorcycle. In both Trautwein patents the rider remains seated on the traditional motorcycle seat.

Other references, such as the Korff U.S. Pat. No. 3,610,358 and Wood U.S. Pat. No. 4,506,753, disclose replacing the front wheel of a conventional motorcycle with a pair of opposed wheels mounted to an elongated frame, and the frame is mounted to the conventional motorcycle frame. The opposed front wheels extend forward of the location of the conventional motorcycle front wheel, providing for greater longitudinal stability. However, Korff and Wood are more like automobiles in that the driver sits in the frame and operates the three-wheeled vehicle with an alternate set of controls, not the controls of the conventional motorcycle. The elongated frame is enclosed with a shell.

SUMMARY OF THE INVENTION

According to the invention, a conversion kit for converting a conventional two-wheeled cycle with a single front wheel into a three-wheeled vehicle with two front wheels mounts to the front of the cycle, replacing the cycle single front wheel with a frame which supports two laterally spaced front wheels of the conversion kit. The cycle has a cycle frame with handlebars, a head portion comprising two triple tree plates, a pair of front fork tubes passing through the triple tree plates, a back wheel mounted to the cycle frame and a front wheel mounted to the front fork tubes. The conversion kit comprising a kit frame, a wheel assembly, a suspension system and a steering system.

The kit frame comprises a pair of sides rigidly connected together in spaced apart relationship to form a rigid box-like configuration having a longitudinal axis, collars mounted to the rear portion of the kit frame for mounting the front fork tubes of the cycle and couplings for rigidly mounting the rear portion of kit frame to the cycle frame and to at least one of the cycle triple tree plates. The wheel assembly comprises two laterally spaced wheels, wheel mounts and an axle. The axle mounts a pair of wheels at ends thereof for rotation with respect to the axle about a horizontal axis and for pivotable motion about vertical axes with respect to the axle. The suspension system mounts the axle transversely to the kit frame. The steering assembly connects the handlebars to the wheels to steer the wheels when the handlebars are turned.

Preferably, the wheel assembly comprises an axle, wheel mounts mounted to each end of the axle and rotatable about a vertical axis and a wheel mounted to each wheel mount for rotation about a horizontal axis. Preferably, the steering system comprises a down shaft connected to the handlebars for rotation with respect to the triple tree and with respect to the kit frame, a horizontal shaft extending from the rear portion to the front portion of the kit frame, a universal coupling between the rear portion of the down shaft and the horizontal shaft, a coupling between the front portion of the horizontal shaft and the wheel mounts and a coupling between the wheel mounts for providing simultaneous pivoting of the wheel mounts about the vertical axis.

In a preferred embodiment of the invention, the suspension system for suspending the axle with respect to the frame comprises a leaf spring mounted parallel to the axis. The conversion kit includes a steering damper for reducing the vibrations transmitted from the road to the steering assembly. The steering damper is mounted between the coupling connecting the two wheel mounts and the axle.

In the preferred embodiment of the invention, a drag link is mounted between the axle and a front portion of the kit frame for centering the axle with respect to the kit frame. Radius rods are connected between the axle and the rear portion of the kit frame for preventing the front axle from rotating during braking and acceleration. The radius rods also maintain the front axle perpendicular to the kit frame and provide adjustment of the caster by changing their respective lengths. An anti-roll bar is mounted between the front portion of the kit frame and the axle for retarding the rotation of the kit frame with respect to the axle. The anti-roll bar preferably is U-shaped, extends forwardly of the axle and is mounted to the kit frame and axle through elastomeric bushings. The coupling between the kit frame and the cycle frame is preferably on the lower rear of the kit frame and spaced downwardly from the collars. The parallel sides of the kit frame are rigidly connected together by cross tubes and the parallel sides have a truncated triangular shape. The coupling between the wheel mounts is a tie rod mounted to each wheel mount by a ball joint. The plate for mounting one of the triple tree plates to the rear portion of the kit frame is mounted to the lower triple tree plate by bolts passing through corresponding holes in the plate and the lower triple tree plate causing the triple tree to clamp around the front fork tubes.

In another embodiment of the invention, the invention relates to a three-wheeled vehicle comprising the conversion kit described above connected to the triple tree and frame of a motorcycle from which a front wheel has been removed.

The invention provides for increasing both the lateral and longitudinal stability of a conventional motorcycle while maintaining the conventional positioning of the motorcycle rider. The front wheel is replaced with a pair of laterally spaced wheels connected to the conventional front fork by an elongated tubular frame. The tubular frame is narrow and does not provide for enclosing the driver within the frame. The elongated frame provides for greater longitudinal stability and the opposed front wheels provide for greater lateral stability. The tubular frame is directly mounted to the conventional motorcycle front fork, requiring limited modification to the conventional motorcycle and eliminating special connectors required by prior designs.

BRIEF DESCRIPTION OF THE DRAWINGS

The invention will now be described with reference to the drawings in which.

DETAILED DESCRIPTION OF THE PREFERRED EMBODIMENTS

Figure 1:
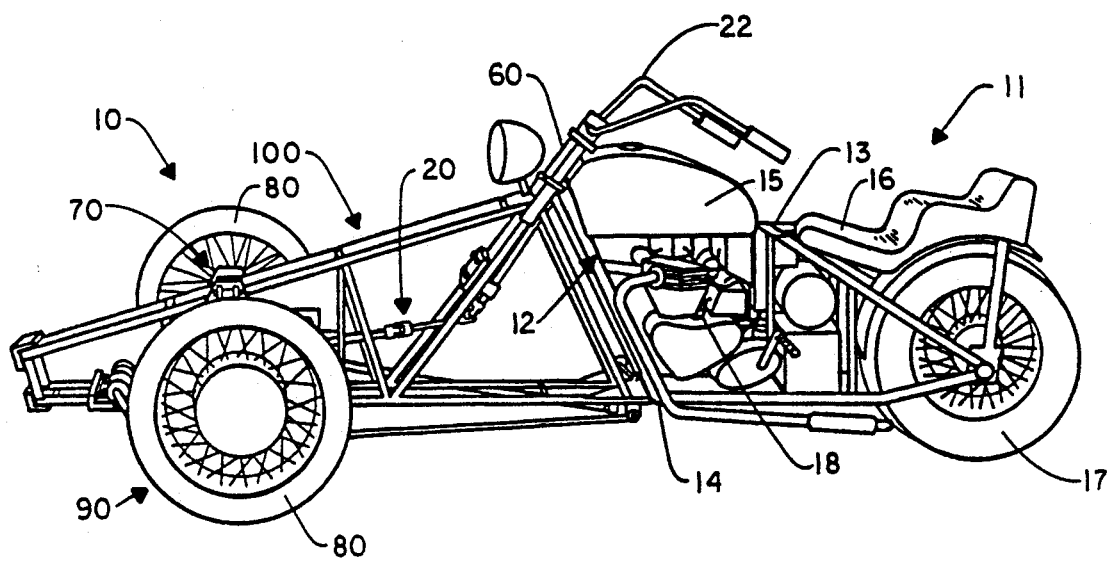
FIG. 1 is a side view of a three-wheeled vehicle which incorporates a conversion kit according to the invention.

Referring now to the drawings and in particular to FIG. 1, there is shown a three-wheeled vehicle having a conversion kit 10 and a conventional motorcycle 11 without the single front wheel. The motorcycle 11 has fuel tank 15, seat 16, rear tire 17, engine 18, handlebars 22, head 60 and frame 12 which has an upper frame 13 and a lower frame portion 14. The conversion kit for a three-wheeled vehicle 10 comprises tubular frame or kit frame 100, wheel assembly 90, suspension system 70 and steering system 20. To convert a conventional motorcycle 11 to a three-wheeled vehicle, the front wheel (not shown) of the conventional motorcycle 11 is removed and the kit frame 100 is rigidly mounted to the upper and lower frame portions 13, 14 of motorcycle frame 12.

Figure 2:
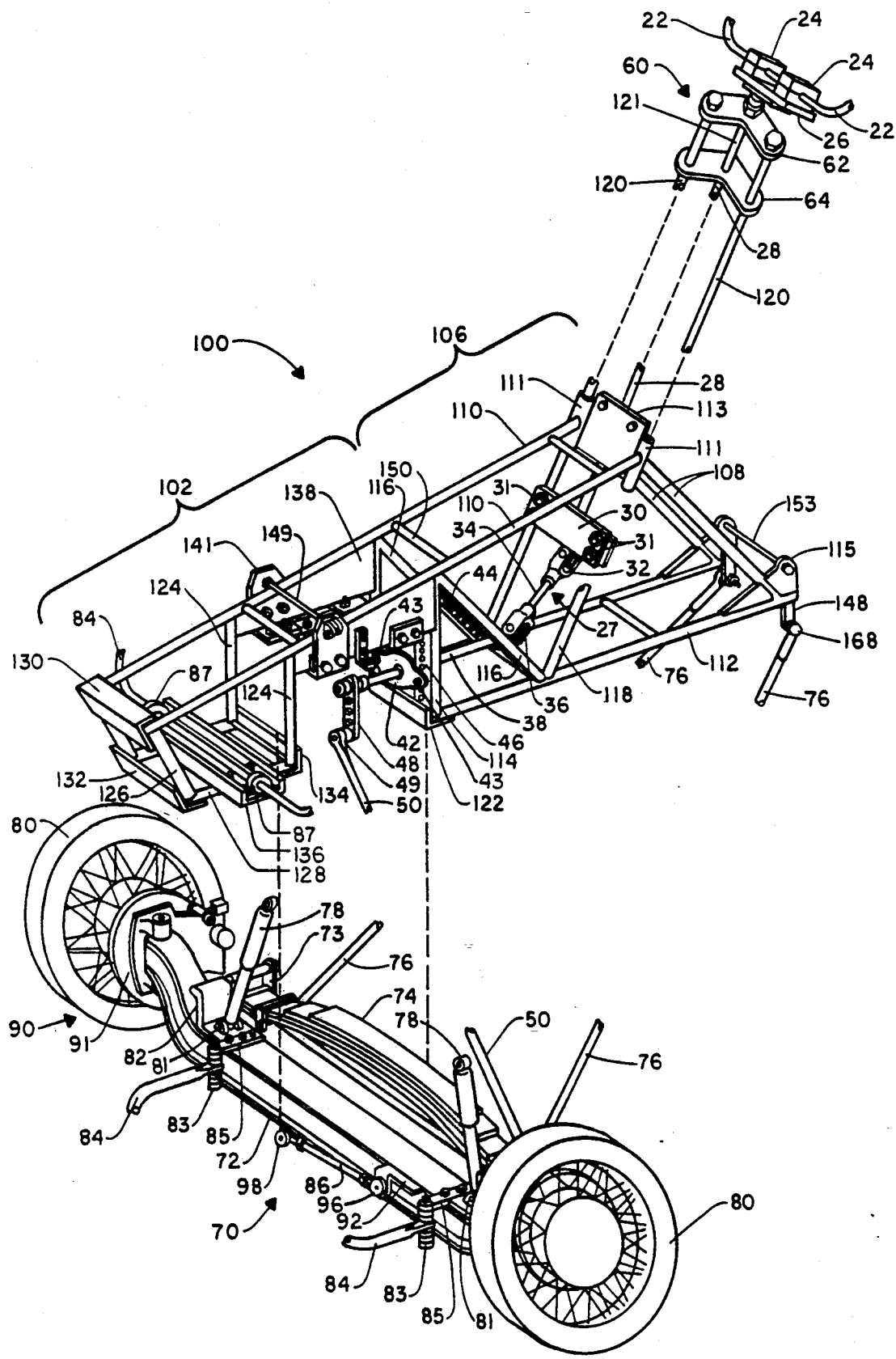
FIG. 2 is an exploded view of the conversion kit shown in FIG. 1.

Referring now to FIG. 2, the kit frame 100 is box-shaped and has parallel identical sides shaped like truncated triangles and connected by multiple cross tubes 150, thus forming the box-shaped kit frame 100. Preferably, the kit frame 100 is comprised of a front section 102 and a back section 106. The back section 106 is further comprised of down tubes 108, upper tubes 110, rear lower tubes 112, rear vertical tubes 114, collars 111, upper plate 113 and lower plate 115. The upper tubes 110 and down tubes 108 are welded to the collars 111. The collars 111 are welded together by the upper plate 113 and a cross brace 117 which is also welded to the upper plate 113. The down tubes 108 and the rear lower tubes 112 are welded to the lower plate 115. The rear lower tubes 112 and the rear vertical tubes 114 are welded together and welded to the rear lower brace 122.

The back section 106 is further comprised of support tubes 116 and tube extensions 118 which are preferably welded to the other frame members. A first pair of adjustment plates 44 and a second pair of adjustment plates 46 are welded to the support tubes 116 and the rear vertical tubes 114, respectively.

The front section 102 of the kit frame 100 comprises the rear vertical tubes 114, upper tubes 110, front vertical tubes 124, front tubes 126, lower front tubes 128 and triangular plates 138. The rear vertical tubes 114, upper tubes 110 and front vertical tubes 124 are all welded to triangular plates 138. The front vertical tubes 124 and the lower front tubes 128 are welded together and to a lower rear brace 134. The front tubes 126 and lower front tubes 128 are welded together and to a lower front brace 132. The upper tubes 110 and front tubes 126 are welded together and to an upper brace 130. A pair of angle irons 136 are bolted to the lower front tubes 128.

The suspension system 70 reduces the amount of road vibration and mounts the wheel assembly 90 to the frame 100. Preferably, the suspension system 70 is comprised of the leaf spring 74 and the shock absorbers 78.

The wheel assembly 90 is comprised of an axle 72, opposed wheels 80, and wheel mounts 91. Opposed wheels 80 are rotationally and pivotally mounted to wheel mounts 91 for horizontal rotation with respect to the axle 72 and pivoting about a vertical axis to provide steering. The wheel mounts 91 are mounted to opposite ends of the axle 72.

Figure 3:
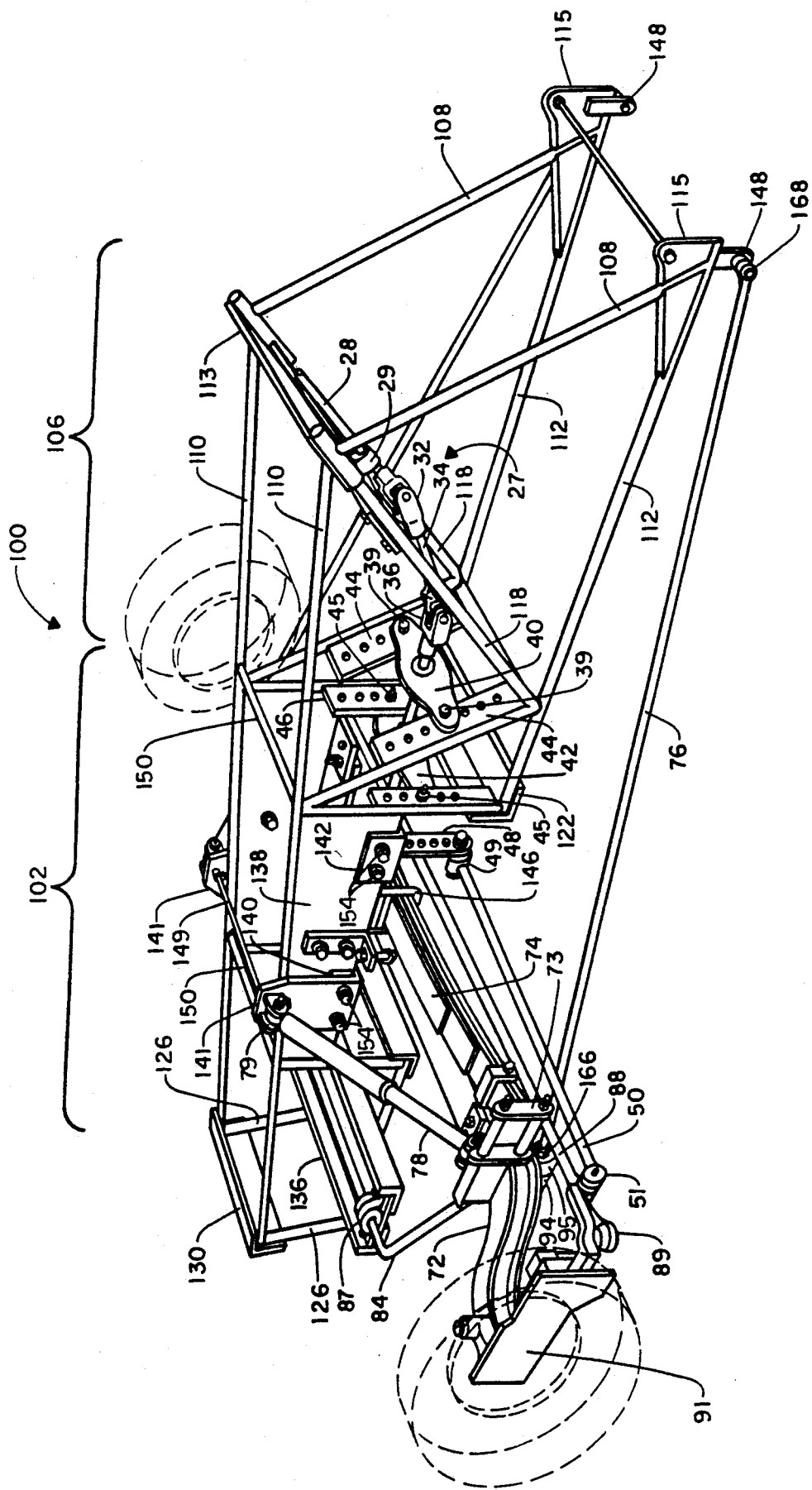
FIG. 3 is a perspective view showing the conversion kit frame shown in FIG. 2.
Figure 4:
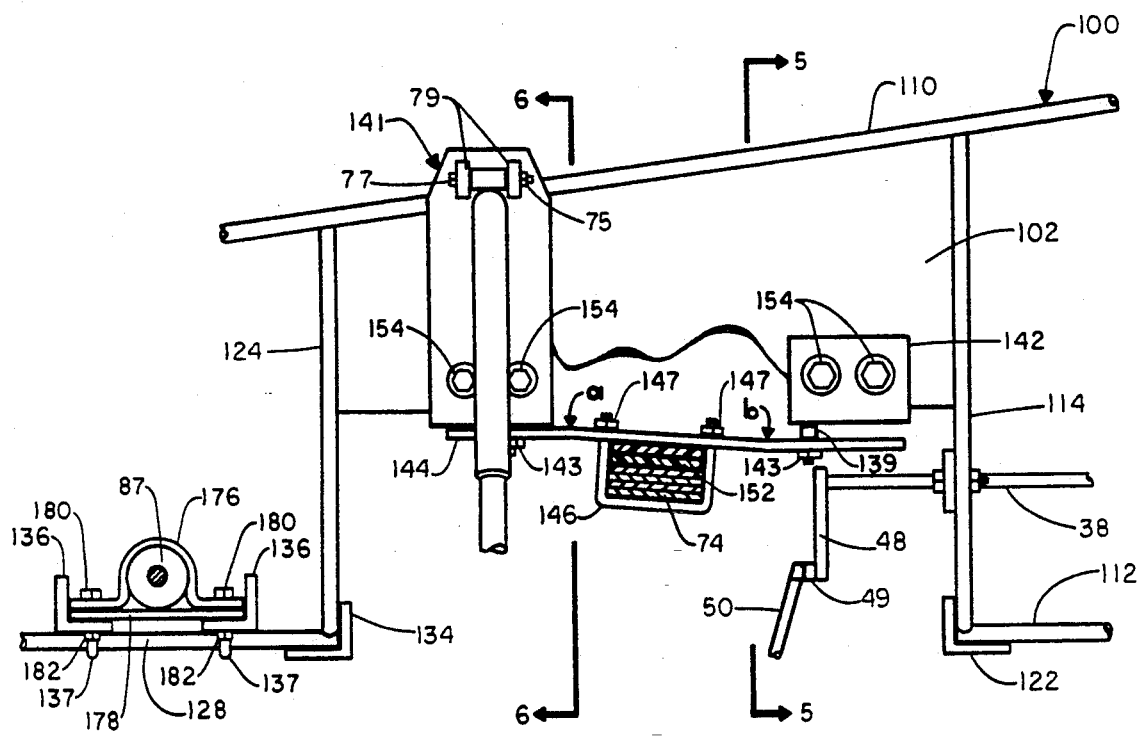
FIG. 4 is a partial side elevational view partly in section of the conversion kit frame shown in FIGS. 1-3.

Referring generally now to FIGS. 2-6 and specifically to FIG. 4, the front section 102 of the kit frame 100 mounts the suspension system 70. Each triangular plate 138 of the front section 102 of the kit frame 100 has L-shaped brackets 140, 142 bolted thereto by bolts 154 and nuts 156. Each L-shaped brackets 140 is overlaid with a plate 141 having a pair of mounting flanges 79 with aligned openings. The bolts 154 and nuts 156 mount the lower portion of the plates 141 to the L-shaped brackets 140. The upper portion of the plates 141 are connected by plate bolt 149. The mounting flanges 79 pivotally mount the upper ends of shock absorbers 78 to the frame 100 through a threaded bolt 77 which passes through the aligned openings of upper mounting flanges 79 and is secured in place by a nut 75.

A horizontal plate 144 having four holes is connected, preferably by bolts 143 and nuts 145 passing through the outermost holes, to the lower portions of both the first and second L-shaped brackets 140, 142. The threaded ends of U-shaped brackets 146 pass through the inner two holes of the horizontal plate 144. The U-shaped brackets 146 capture the leaf spring 74 and bushings 152 disposed above the leaf spring 74. The U-shaped brackets have threaded ends which extend through holes in the horizontal plates 144. Nuts 147 are threaded onto the ends of the U-shaped brackets 146 to effectively secure the leaf spring 74 to the first and second L-shaped brackets 140, 142 and to the kit frame 100. Preferably, the horizontal plate 144 is bent at a predetermined angle at point a and bent upward the same predetermined angle at point b to impart a predetermined amount of caster equal to the predetermined angle to the mounted leaf springs 74 and bushings 152. The horizontal plate 144 is supplied with spacers 139 at the second L-shaped brackets 142 at bolts 143 and nuts 145.

The suspension system 70 further mounts to the wheel assembly 90, providing for the wheel assembly 90 to be connected to the kit frame 100 by the suspension system 70, Preferably, the ends of the leaf spring 74 are pivotally mounted to L-shaped platforms 82 by the shackles 73 which are welded to the axle 72. The shocks are pivotally mounted to the L-shaped platforms 82, preferably by the lower mounting flanges 81 in the same manner that the upper portion of the shock absorber 78 is mounted to the L-shaped bracket 140.

Figure 7:
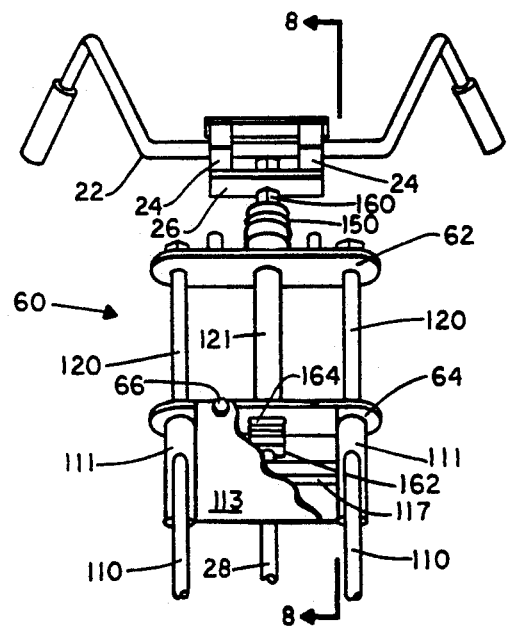
FIG. 7 is a partial frontal view of portions of the conversion kit frame and the front fork of a conventional motorcycle which forms part of the vehicle shown in FIG. 1.

The steering system 20 links the traditional handlebars 22 of the conventional motorcycle 11 with the laterally spaced wheels 80. (FIGS. 2, 3 and 7). The steering system 20 is comprised of handlebars 22, down shaft 28, universal joints 32, 36, short shaft 34, horizontal shaft 38, steering arm 48, steering rod 50, steering damper 52 and tie rod 88. The steering system 20 further comprises the head 60 of the conventional motorcycle which comprises an upper and lower triple tree 62, 64, front fork tubes 120 and center tube 121.

The steering system 20 links the handlebars 22 with the laterally spaced wheels 80 of the suspension system 70, so that the operator of the motorcycle can turn the handlebars 22, causing a corresponding turn in the wheels 80, thus aiding the driver in maneuvering through a turn. Preferably, the handlebars 22 of the conventional motorcycle 11 are mounted to a base plate 26 by sandwiching the handlebars between a pair of opposed mounting plates 24 and mounting the opposed mounting plates to the base plate 26. The base plate 26 is then mounted to the down shaft 28 which passes through the upper triple tree 62, lower triple tree 64 and center tube 121 on the head 60 of the conventional motorcycle 11. The center tube 121 is welded to the upper and lower portions 13, 14 of the motorcycle frame 12. The down shaft 28 is retained by a set collar 162 and thrust bearing 164 on the bottom of the lower triple tree 64, by a thrust bearing 158 and retaining nut 160 on top of the upper triple tree 62, and by passing the down shaft 28 through a self-aligning bearing 29 mounted on the back side of the front fork tubes 120. The heat sink 30 is connected to the front fork tubes 120 by bolts 31 which pass through holes in the heat sink 30, front fork tubes 120 and self-aligning bearing 29.

The down shaft 28 is connected to the horizontal shaft 38 by a universal coupling 27. The universal coupling is comprised of first universal joint 32, short shaft 34 and second universal joint 36. The lower end of the down shaft is connected to the first universal joint 32. The short shaft 34 connects the first universal joint 32 with the second universal joint 36. The second universal joint 36 is connected to the horizontal shaft 38.

Figure 5:
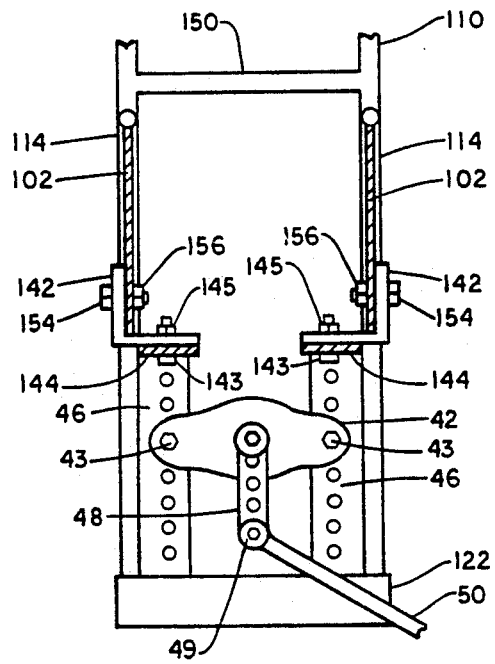
FIG. 5 is a partial sectional view taken along the line 5—5 of FIG. 4.

Alignment means are provided for aligning and retaining the horizontal shaft 38 in a desired position (FIGS. 2, 3 and 5). Preferably, the horizontal shaft 38 passes through a first self-aligning bearing 40 and a second self-aligning bearing 42. The first self-aligning bearing 40 is mounted to a first pair of adjustment plates 44 by bolts 39 and nuts 41. The second self-aligning bearing 42 is mounted to a second pair of adjustment plates 46 by bolts 43 and nuts 45. The combination of first and second alignment bushings and first and second adjustment plates provide for maintaining the horizontal shaft 38 in the desired position.

One end of the steering arm 48 is rigidly attached to the end of the horizontal shaft 38 opposite the second universal joint 36. The other end of the steering arm 48 is attached to the steering rod 50, preferably by a ball joint 49. The other end of the steering rod 50 is rotatably connected to one of the wheel mounts 91, preferably by a ball joint 51.

The wheel mounts 91 are coupled together, providing for the simultaneous movement of both wheels in response to the movement of the steering rod 50, preferably by the tie rod 88. The tie rod 88 is connected, preferably by ball joints 89, to each of the wheel mounting assemblies 90.

Figure 6:
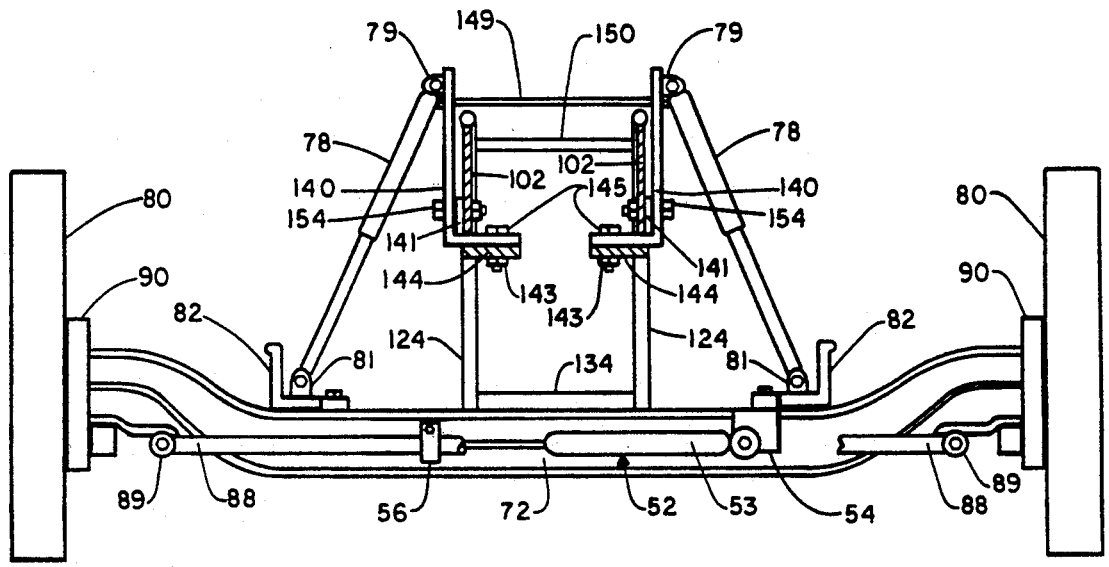
FIG. 6 is a partial sectional view taken along the line 6—6 of FIG. 4.

Referring now to FIG. 6, a steering damper 52 is provided for damping the vibrations from the road surface passing through the wheels 80 and into the tie rod 88 and steering system 20. The steering damper 52 is comprised of a hydraulic cylinder 53, mounting bracket 54 and U-shaped bracket 56. The steering damper 52 is preferably connected to the axle 72 and the tie rod 88. One end of the steering damper 52 is connected to axle 72 through a mounting bracket 54. The other end of the steering damper 52 is connected to the tie rod 88 by a U-shaped bracket 56 which surrounds the tie rod 88. The steering damper passes through aligned holes on each terminal end of the U-shaped bracket 56 where a nut is threaded onto the end of the steering damper, causing the U-shaped bracket 56 to pinch around the tie rod 88, securing the steering damper 52 to the tie rod 88.

In operation, as the handlebars 22 are turned either clockwise or counterclockwise, a corresponding rotation is transferred first to the down shaft 28 and to the short shaft 34 through the first universal joint 32. The motion is then transferred from the short shaft 34 through the second universal joint 36, causing a corresponding rotation of the horizontal shaft 38 which causes the steering arm 48 to move clockwise or counterclockwise, correspondingly. As the steering arm 48 moves clockwise or counterclockwise, the steering rod 50 moves left or right, as viewed from the driver's position, causing a corresponding turning of the wheels, providing for the maneuvering of the three-wheeled vehicle through a turn.

Referring now to FIGS. 2 and 3, radius rods 76 are provided for preventing the rotation of the front axle during braking. Preferably, the radius rods 76 are threaded at each end and are attached to the axle 72 by rubberized strut rod bushings 94 after one end of the radius rod 76 is passed through a circular bracket 95 which is welded at a desired angle to the bottom of the axle 72. Adjusting/retaining nuts 166 are tightened on either side of the circular bracket 95 for adjusting the caster and to compress the rubberized strut rod bushings 94. The other ends of the radius rods 76 are connected by tie rod ends 168 to flanges 148 which are welded to the lower plates 115 at the back portion of the back section 106 of the kit frame 100.

Referring now to FIG. 2, an axle centering drag link 86 is provided for adjusting and centering the axle 72 with respect to the kit frame 100. A drag link mounting bracket 92 is bolted to the axle 72 and the drag link 86 is connected to the mounting bracket, preferably by a ball joint 96. The other end of the drag link 86 is connected to the lower rear brace 134, also preferably by a ball joint 98.

Referring now to FIGS. 2 and 3, the anti-roll bar 84 provides torsional stability. The terminal ends of the anti-roll bar 84 are mounted to the axle 72 by brackets 85 having bushings 83. The middle portion of the anti-roll bar 84 is mounted, preferably by rubberized retaining rings 87, to the pair of angle irons 136 by upper strap 176 and lower strap 178 which are bolted together and to the angle irons 136 by bolt 180 and nut 182.

The angle irons 136 are bolted to the lower front tubes 128 by four U-bolts 137 to facilitate adjustment of the anti-roll bar 84. The U-bolts 137 encompass the lower front tubes 128 and the ends of the U-bolts 137 pass through holes in the angle irons 136 and are secured by nuts threaded onto the ends of the U-bolts 137.

Figure 8:
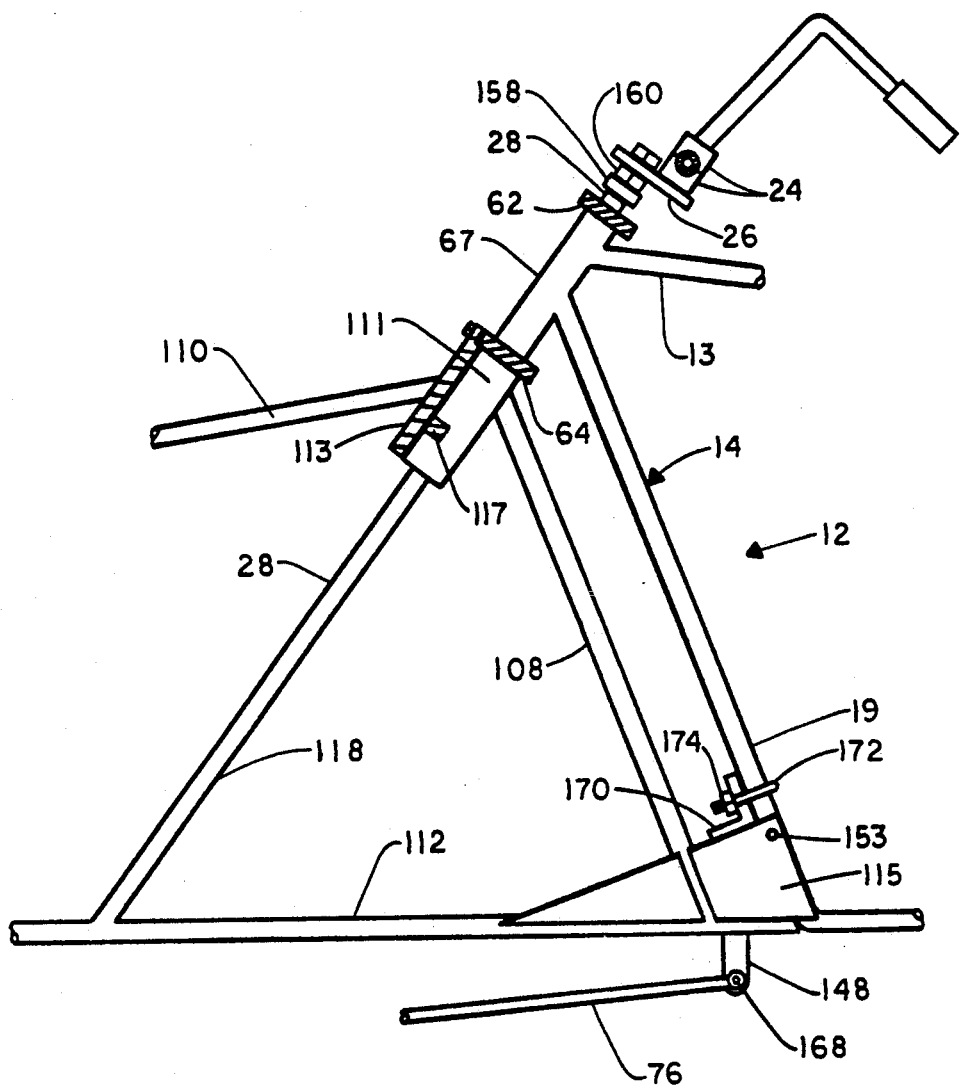
FIG. 8 is a partial sectional view taken along the line 8—8 of FIG. 7.

To convert a conventional two-wheeled motorcycle, into a three wheeled vehicle, the front wheel of the two-wheeled motorcycle is first removed, leaving the front fork tubes 120 and head 60 of the conventional two-wheeled motorcycle (FIGS. 7, 8). The kit frame connects to the head 60, front fork tubes 120 and upper and lower portions 13, 14 of frame 12 of the conventional motorcycle 11. Preferably, the upper and lower rear portions of the kit frame 100 is connected to the head 60 and the lower frame 14 of the conventional motorcycle 11, respectively.

To connect the upper rear portion of the kit frame 100 to the head 60 of the conventional motorcycle 11, the front forks 120 are inserted through the openings in the collars 111. If the front forks 120 are long enough, they are welded to the rear lower tubes 112. However, if the front forks 120 are not long enough to reach the rear lower tubes 112, tube extensions 118 are welded to the front forks 120 at one end and to the rear lower tubes 112 at the other end. The upper plate 113 connecting the collars 111 extends upwardly and has two holes which register with similar holes in the lower triple tree 64 of the head 60. Bolts 66 are passed through the corresponding holes in the upper plate 113 and the lower triple tree 64 and are tightened by nuts 68, causing the lower triple tree to pinch fit around the front forks 120, rigidly securing the upper plate 113 and the kit frame 100 to the head 60 of the conventional motorcycle 11.

The kit frame 100 is further secured to the lower portion of the conventional motorcycle preferably by bolting the lower plate 115 to the lower frame 14 of the conventional motorcycle 11 by the frame/engine bolt 153. The shape of the lower plates can vary significantly depending upon the application. The lower rear section of kit frame 100 can be even further secured to the conventional motorcycle frame 12 by welding an angle iron 170 on the top of the lower plates 115 and abutting the lower frame down tubes 19 which in this case are two in number. Correspondingly, holes are drilled in the angle iron 170 which allow the passage of two U-bolts 172 from the rear of the lower motorcycle frame down tubes 19 which are rigidly secured to the angle iron 170 by nuts 174. If the conventional motorcycle frame 12 has a single down tube 19, only two holes are required at the center of the angle iron 170 for the passage of a U-shaped bolt 172 to be rigidly affixed to the angle iron 170 by nuts 174.

Primary freezing of the head 60 is achieved by welding down tubes 108 to the kit frame 100, collars 111 and the lower plates 115. Connecting the kit frame 100 to the head 60 and the lower frame 14 of the conventional motorcycle also freezes the head 60 in a fixed position and the handlebars 22 which are originally connected to the head 60 of the conventional motorcycle. Therefore, in order to turn the front wheels 80, it is necessary to provide for the turning of the front wheels 80 by the handlebars 22. The handlebars 22 are removed from the upper triple tree plate 62 and are mounted to the base plate 26 by the opposed mounting plates 24. The base plate 26 is mounted to the down shaft 28 which passes through the center tube 121 of the head 60 and is rotatable with respect thereto. Thus, the handlebars 22 can be rotated with respect to the fixed head 60, causing a corresponding rotation of the opposed front wheels 80, providing for steering the three-wheeled vehicle.

Reasonable variation and modification are possible within the spirit of the foregoing specification and drawings without departing from the scope of the invention.

The embodiments for which an exclusive property or privilege is claimed are defined as follows:

1. A conversion kit for converting a conventional two-wheeled cycle with a single front wheel into a three-wheeled vehicle with two front wheels by mounting the conversion kit to the front of the cycle, replacing the single front wheel with two laterally spaced front wheels, the cycle having a cycle frame with handlebars, a head portion comprising two triple tree plates, a pair of front fork tubes passing through the triple tree plates, a back wheel mounted to the cycle frame and a front wheel mounted to the front fork tubes, the conversion kit comprising:

a kit frame comprising:
a pair of sides rigidly connected together in spaced apart relationship to form a rigid box-like configuration having a longitudinal axis,
collars mounted to the rear portion of the kit frame for mounting the front fork tubes of the cycle, and
couplings for rigidly mounting the rear portion of the kit frame to the cycle frame and to at least one of the cycle triple tree plates;

a wheel assembly mounting a pair of wheels in lateral spaced apart relationship for rotation about a horizontal axis and for pivotable motion about vertical axes;

a suspension system for mounting the wheel assembly to the kit frame; and a steering assembly for connecting the handlebars to the wheels to steer the wheels when the handlebars are turned.

2. The conversion kit according to claim 1 wherein the wheel assembly comprises an axle, wheel mounts mounted to each end of the axle and rotating about a vertical axis, a wheel mounted to each wheel mount for rotating about a horizontal axis, and couplings between the wheel mounts so the wheel mounts pivot in unison about the vertical axis.

3. The conversion kit according to claim 2 wherein the steering system comprises a down shaft connected to the handlebars for rotation with respect to the triple tree and with respect to the kit frame, a horizontal shaft extending from the rear portion to the front portion of the kit frame, a universal coupling between the rear portion of the down shaft and the horizontal shape, and a coupling between the front portion of the horizontal shaft and the wheel mounts.

4. The conversion kit according to claim 2 wherein the suspension system comprises a spring and a pair of shock absorbers.

5. The conversion kit according to claim 4 wherein the spring is a leaf-type spring which is mounted parallel to the axle.

6. The conversion kit according to claim 2 and further comprising a steering damper for reducing the vibrations transmitted from the road surface into the steering assembly.

7. The conversion kit according to claim 3 wherein the steering damper is mounted between the coupling connecting the two wheel mounts and the axle.

8. The conversion kit according to claim 2 and further comprising a drag link mounted between the axle and the front portion of the kit frame for centering the axle with respect to the kit frame.

9. The conversion kit according to claim 2 and further comprising radius rods connected between the axle and the rear portion of the kit frame for preventing the front axle from rotating during braking and acceleration, to keep the axle perpendicular to the frame and to provide for adjusting the caster.

10. The conversion kit according to claim 2 and further comprising an anti-roll bar for retarding the rotation of the kit frame with respect to the axle and mounted between the front portion of the kit frame and the axle.

11. The anti-roll bar according to claim 10 wherein the anti-roll bar is U-shaped, extends forwardly of the axle and is mounted to the kit frame and axle through elastomeric bushings.

12. The conversion kit according to claim 2 wherein the coupling between the wheel mounts is a tie rod mounted to each wheel mount by a ball joint.

13. The conversion kit according to claim 1 wherein the coupling between the kit frame and the cycle frame is on the lower rear of the kit frame and spaced downwardly from the collars, freezing the motion of the triple tree.

14. The conversion kit according to claim 1 wherein the pair of parallel sides are rigidly connected together by cross tubes.

15. The conversion kit according to claim 1 wherein the pair of parallel sides have a truncated triangular shape.

16. The conversion kit according to claim 1 wherein the plate for mounting one of the triple tree plates to the rear portion of the kit frame is mounted to the lower triple tree plate by bolts passing through corresponding holes in the plate and the lower triple tree plate, causing the triple tree to clamp around the front fork tubes.

17. A three-wheeled vehicle comprising:
   a conventional two-wheeled cycle comprising:
     a cycle frame with handlebars,
     a head portion having two triple tree plates,
     a pair of front fork tubes passing through the triple tree plates, and
     a back wheel mounted to the cycle frame; and
   a conversion kit mounted to the front of the cycle frame after removing the cycle front wheel, the conversion kit comprising:
     a kit frame comprising:
       a pair of sides rigidly connected together in spaced apart relationship to form a rigid box-like configuration having a longitudinal axis,
       collars mounted to the rear portion of the kit frame mounting the front fork tubes of the cycle,
       couplings rigidly mounting the rear portion of the kit frame to the cycle frame and to at least one of the cycle triple tree plates;
     a wheel assembly mounting a pair of wheels at ends thereof for rotation about a horizontal axis and for pivotable motion about vertical axes axle;
     a suspension system for mounting the axle transversely to the kit frame; and
     a steering assembly connecting the handlebars to the wheels to steer the wheels when the handlebars are turned.

* * * * *